Aug. 21, 1945.   L. R. LUDWIG ET AL   2,383,327
ELECTRICAL SYSTEM
Filed Nov. 7, 1941   2 Sheets-Sheet 1
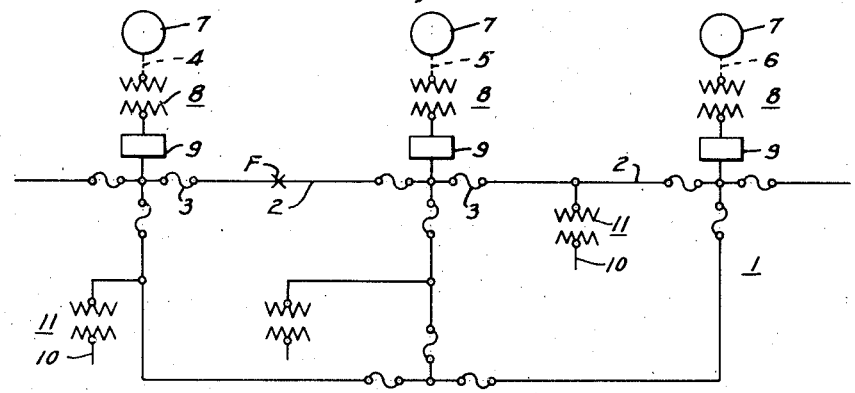
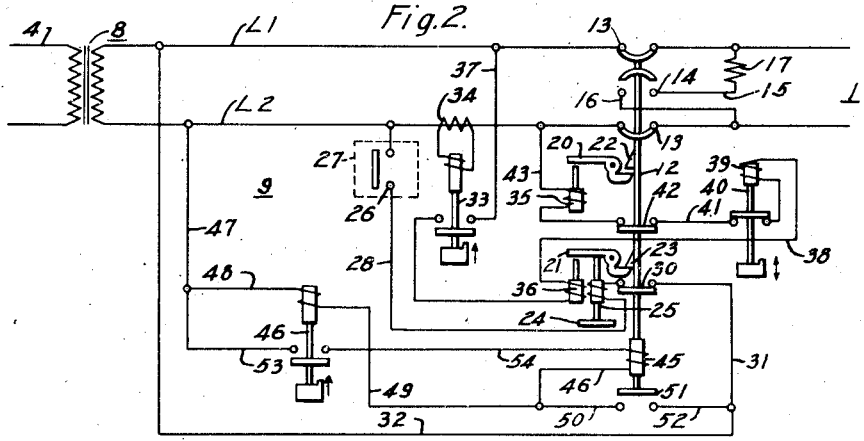
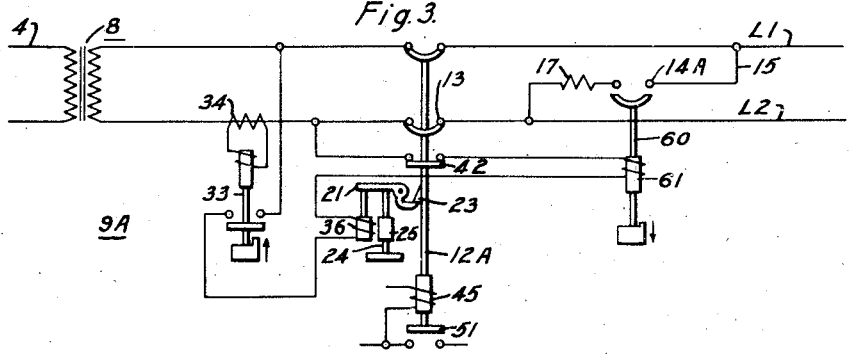
WITNESSES:
INVENTORS
Leon R. Ludwig &
Royal C. Bergvall.
BY
ATTORNEY

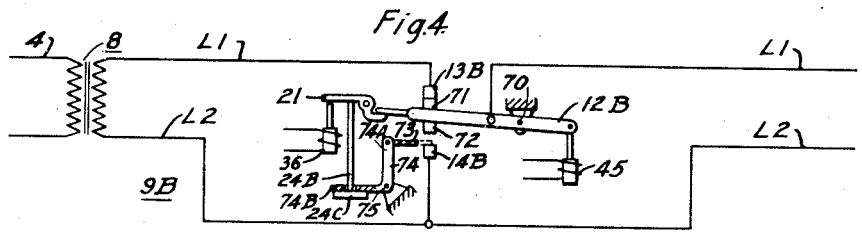
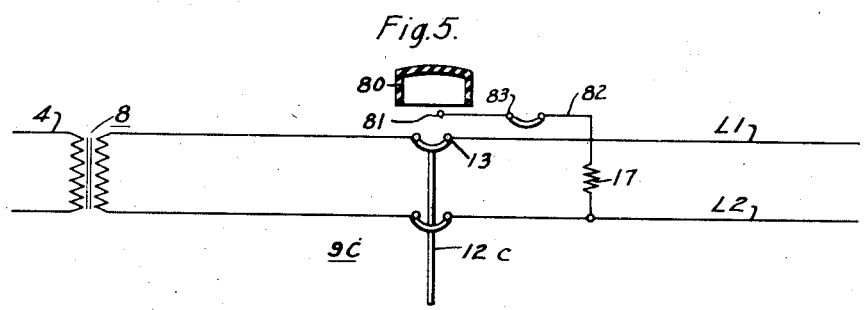
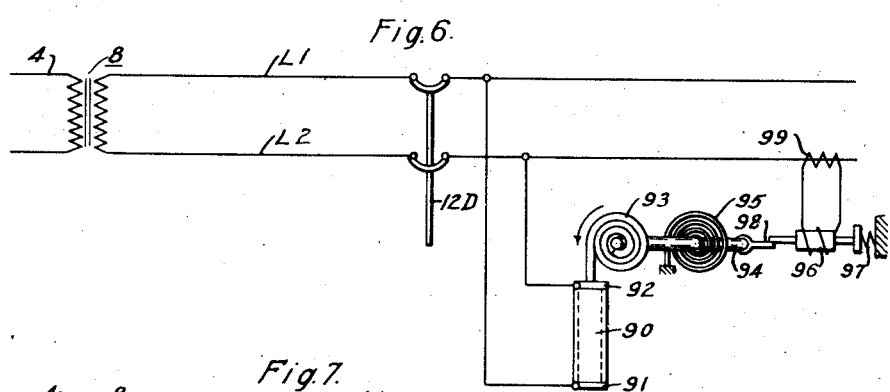
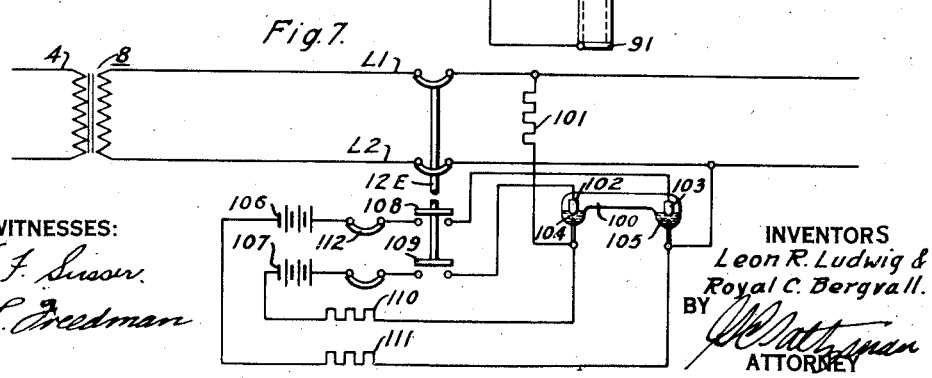

Patented Aug. 21, 1945

2,383,327

UNITED STATES PATENT OFFICE 2,383,327

ELECTRICAL SYSTEM

Leon R. Ludwig and Royal C. Bergvall, Forest Hills, Pa., assignors to Westinghouse Electric Corporation, East Pittsburgh, Pa., a corporation of Pennsylvania Application November 7, 1941, Serial No. 418,168

16 Claims. (Cl. 175—294)

This invention relates to electrical systems, and it has particular relation to electrical systems for the transmission and distribution of electrical energy.

One of the most satisfactory electrical systems for distributing electrical energy is that known as the network system. This may take the form of a secondary network system or a primary network system. In the secondary network system electrical energy from a plurality of sources of electrical energy is supplied to a common secondary network circuit through network transformers and network protectors. If a fault occurs on the secondary network circuit, current from all sources of electrical energy is available for burning clear the fault. If a fault occurs on one of the sources of energy such as a feeder circuit, the protectors associated with the faulty source of energy operate to disconnect the source from the secondary network circuit. Under these conditions the network secondary circuit continues to receive energy from the remaining sources of energy. A secondary distribution system of this type is disclosed, for example, in the Parsons Patent 1,997,597.

The primary network distribution system resembles in many respects the secondary or low voltage network distribution system but is intended for operation at substantially higher voltages. Because of these higher voltages, generally it is inadvisable to burn clear faults occurring on the primary mains. Consequently it is customary to employ a sectionalizing circuit breaker at each end of each network main. When a fault occurs on a network main the sectionalizing circuit breakers operate at each end of the network main to remove the faulty main from service. Primary network distribution systems of this type are disclosed in the Parsons Patents 1,947,100 and 1,955,311 which are assigned to the Westinghouse Electric & Manufacturing Company. Although primary network distribution systems of this type afford excellent service, their cost has restricted the field of application therefor.

According to this invention the sectionalizing circuit breakers heretofore employed on primary network distribution systems are replaced by sectionalizing fuses or equivalent circuit interrupters. Each source of electrical energy is connected to the network circuit through a protector unit which disconnects the source upon the occurrence of a fault on an adjacent network main. The protector unit also serves to lower the voltage adjacent the fault by applying to the network circuit a shunt or artificial short circuit. The resulting drop in voltage in the neighborhood of the fault facilitates fault clearance.

Primary network distribution systems generally include network mains having substantial impedance. Consequently, when a fault occurs on a secondary main, most of the fault current is supplied by adjacent sources of electrical energy. When the protector units of the adjacent sources of electrical energy operate to disconnect the sources, a shunt or artificial short circuit may be applied to the faulty secondary main for the purpose of lowering the voltage thereon without drawing excessive current from the more distant sources of electrical energy. As hereinafter pointed out, such a shunt may be established in various ways. For example, a shunt may be established by means of switch contacts, or fuse means, or a vapor discharge may be initiated between the conductors of the main through control by back contacts on a protector unit circuit breaker of the grid of a vapor discharge tube, which may be of the well-known mercury pool type, connected across the conductors.

After the fault on a network main has cleared the shunt or artificial short circuit is interrupted and the disconnected sources of energy are reconnected to the network circuit to restore complete service thereto. Since the greater proportion of faults occurring on a primary network system are initiated by a transitory condition, such as lightning or swaying of overhead conductors, the clearance of such faults is desirable without permanent removal of sources of electrical energy from service. Such operation is assured by means embodying this invention.

If the fault on a secondary main is permanent, the fuses adjacent the fault blow to remove the faulty main from service. To facilitate the blowing of these fuses, the protector units are designed preferably to disconnect and reconnect the associated sources of energy a predetermined number of times or for a predetermined interval in an effort to clear the fault. After the expiration of a predetermined number of operations or time, the protector units adjacent a permanent fault reconnect their associated sources of energy to the primary network circut for a time at least sufficient to assure blowing of the fuses on each side of the fault. The primary network system then continues in operation except for the faulty network main.

Under certain conditions it may be desirable to operate a protector unit without establishing a shunt or artificial short circuit on the primary network circuit. Such conditions may include manual disconnection of the source of energy for inspection purposes.

It is therefore an object of the invention to provide an improved system for the transmission and distribution of electrical energy.

It is a further object of the invention to provide a system for transmission and distribution of electrical energy with means effective upon the occurrence of a fault thereon for lowering the voltage of the system adjacent the fault.

It is another object of the invention to provide a distribution circuit supplied with electrical energy from a plurality of sources with means effective upon the occurrence of a fault on the circuit with temporarily disconnecting sources of energy adjacent the fault and for temporarily applying a shunt or artificial fault circuit to the distribution adjacent the fault.

It is a still further object of the invention to provide an improved method for clearing faults on a system for transmitting and distributing electrical energy.

Other objects of the invention will be apparent from the following description taken in conjunction with the accompanying drawings, in which:

Figure 1 is a schematic view in single line of an electrical system embodying the invention;

Fig. 2 is a schematic view of a protector unit suitable for the system disclosed in Fig. 1; and Figs. 3 to 7 are schematic views showing modifications of the unit illustrated in Fig. 2.

Referring to the drawings, Figure 1 shows an electrical system including a distribution circuit 1. This distribution circuit may be formed of a plurality of primary mains 2 which are interconnected to form a primary network circuit or grid. Each end of each primary main 2 is provided with a sectionalizing fuse 3. When a permanent fault F occurs on a secondary main 2, the fuses 3 on each side of the fault blow to remove the faulty main from service.

Electrical energy is supplied to the distribution or primary network circuit 1 from a plurality of sources which are represented by feeder circuits 4, 5 and 6. If desired, these feeder circuits may be supplied from a common generator bus or branch feeder, but for the purpose of illustration, each feeder circuit is connected to a separate electrical generator 7.

The form of energy supplied by the system illustrated in Fig. 1 may vary appreciably. For example, the system may be supplied either with direct current or alternating current. In the case of alternating current, either single phase or polyphase current may be supplied. For the purpose of illustration, it will be assumed, however, that the system of Fig. 1 is a single phase alternating current system designed to supply alternating current at a frequency of 60 cycles per second.

Each of the feeder circuits 4, 5 and 6 is connected to the distribution or primary network circuit 1 through a transformer 8 and a protector unit 9. Suitable load circuits 10 may be connected to the primary mains 2 through load transformers 11.

Referring to Fig. 2, a protector unit 9 is illustrated in detail. In Fig. 2 the feeder circuit 4 is shown connected to the primary winding of the associated transformer 8. The secondary winding of the transformer is connected through two conductors L1 and L2 to the distribution or primary network circuit 1. This connection of the secondary winding is controlled by a circuit breaker 12 having main contacts 13 which may be closed to connect the secondary winding to the distribution or primary network circuit. In addition, the circuit breaker 12 is provided with back contacts 14 which are closed when the circuit breaker is tripped to establish a shunt or artificial short circuit across the conductors L1 and L2 on the distribution or primary network circuit side of the circuit breaker. The resulting shunt circuit may be traced from the conductor L1 through a conductor 15, the back contacts 14 and a conductor 16 to the conductor L2. If desired, an impedance 17 may be included in the shunt circuit for restricting or modifying current flowing therethrough.

By inspection of Fig. 2, it will be observed that the circuit breaker 12 has two limiting positions, in one of which the contacts 13 are closed. In the other position the back contacts 14 of the circuit breaker are closed. In some cases it is desirable that the circuit breaker 12 may be operated to an intermediate position wherein all of the contacts 13 and 14 are open. To this end the circuit breaker 12 may be provided with two tripping latches 20 and 21 which cooperate, respectively, with lugs 22 and 23 carried by the circuit breaker. The tripping latch 21 and its associated lug 23 are so related that the tripping latch holds the circuit breaker 12 in its closed position with the contacts 13 closed. If the tripping latch 21 alone is tripped, the lug 22 drops into engagement with its associated tripping latch 20. These parts are so related that they hold the circuit breaker 12 in an intermediate position with all of the contacts 13 and 14 open. When both tripping latches 20 and 21 are actuated, the circuit breaker 12 opens completely to close its back contacts 14.

Under several conditions the tripping latch 21 alone would be operated. For example, if it were desired to trip manually the circuit breaker 12, such tripping usually would be effected by operation of the tripping latch 21 alone in order to prevent establishment of the shunt circuit across the conductors L1 and L2. For this purpose a manual tripping control element 24 may be provided which operates only on the tripping latch 21. As a further example, it may be desirable to trip only the latch 21 when a fault occurs on the associated feeder circuit. Such tripping may be provided by a tripping solenoid 25 carried by the control element 24. This tripping solenoid 25 may be energized under control of the contacts 26 of a conventional directional relay 27 by a circuit which may be traced from the conductor 28, through the winding of the tripping solenoid 25, front contacts of a pallet switch 30 carried by the circuit breaker 12, a conductor 31 and a conductor 32 to the conductor L1. When a fault occurs on the feeder circuit 4 the directional relay 27 which may be of any conventional construction closes its contacts 26 to operate only the tripping latch 21. Consequently the circuit breaker 12 opens the main contacts 13 without establishing a shunt circuit by operation of its back contacts 14. Preferably the directional relay 27 operates without substantial time delay.

For faults occurring on the distribution or primary network circuit 1, it is desirable that both tripping latches 20 and 21 operate. For this purpose a suitable fault responsive relay 33 may be provided. This fault responsive relay may vary appreciably in construction and operation. For example, it may be responsive to electrical energy flowing through the conductors L1 and L2. For the purpose of illustration, it is assumed that the relay 33 is an overcurrent relay having its operating winding energized from a current transformer 34 associated with the conductor L2. Closure of the front contacts of the relay 33 establishes an energizing circuit for tripping solenoids 35 and 36 associated with the tripping latches 20 and 21. This energizing circuit may be traced from the conductor L1 through a conductor 37, the front contacts of the relay 33, the winding of the tripping solenoid 36, a conductor 38, the energizing winding 39 of a lockout relay 40, back contacts of the lockout relay 40, a conductor 41, front contacts of a pallet switch 42, the winding of the tripping solenoid 35 and a conductor 43 to the conductor L2. Consequently operation of the overcurrent relay 33 trips both of the latches 20 and 21 to disconnect the associated transformer 8 from the distribution or primary network circuit and to establish a shunt circuit for the primary or distribution network circuit.

The overcurrent relay 33 may operate without substantial time delay. However, if further discrimination is desired between relays adjacent a fault and relays at a distance therefrom, the relay 33 may be provided with a small inverse time delay in its contact closing direction.

After the circuit breaker 12 has tripped in response to a fault occurring on the distribution or primary network circuit and a fault has had a chance to clear, it is desirable that the circuit breaker 12 reclose. For this purpose the circuit breaker may be provided with a closing motor or solenoid 45 and a closing relay 46. When the circuit breaker 12 opens, an energizing circuit for the closing relay 46 is established which may be traced from the conductor L2 through a conductor 47, a conductor 48, the energizing winding of the closing relay 46, a conductor 49, a conductor 50, back contacts of a pallet switch 51 carried by the circuit breaker 12, a conductor 52, and the conductor 32 to the conductor L1. The relay 46 may be designed to pick up and close its front contacts when the voltage across the secondary winding of the transformer 8 exceeds a predetermined value such as 90% of its normal value. Preferably the closing relay 46 operates without substantial time delay, but if desired a small delay may be provided in its contact closing direction.

Closure of the contacts of the closing relay 46 establishes a closing circuit for the closing solenoid 45 which may be traced from the conductor L2 through the conductor 47, a conductor 53, the front contacts of the closing relay 46, a conductor 54, the energizing winding of the closing solenoid 45, a conductor 46, the conductor 50, the back contacts of the pallet switch 51, the conductor 52 and the conductor 32 to the conductor L1. When so energized the closing solenoid 45 closes the circuit breaker 12.

If the fault F which occurs on the distribution or primary network circuit 1 is a permanent fault, the circuit breaker 12 associated with the feeder circuit 4 would continue to trip and reclose. After a predetermined number of such tripping and reclosing operations of the circuit breaker or after a reasonable time interval has elapsed within which the fault fails to clear, it is desirable that the fuses 3 adjacent the fault F blow to remove the faulty secondary main 2 from service. To facilitate blowing of these fuses, it is desirable that the circuit breakers 12 associated with the feeder circuits 4 and 5 remain closed after first attempting to clear the fault. This is for the reason that these feeder circuits 4 and 5 are capable of supplying a large amount of current through the fuses to be blown. The desired operation of the circuit breakers may be obtained by opening their tripping circuits after the expiration of the desired number of operations of the circuit breaker or after the expiration of a desired time interval.

In Fig. 2 the lockout relay 40 is provided for opening the tripping circuit of the circuit breaker 12. This lockout relay is provided with a time delay in both its opening and its closing directions. Normally the lockout relay has its back contacts closed. The time delay of the relay in its contact opening direction may be such that the relay opens its contacts in response to two or three immediately consecutive tripping and closing operations of the circuit breaker 12. Such operation permits a circuit breaker 12 to apply its shunt circuit across the conductors L1 and L2 two or three times in an effort to clear the fault F. If the fault fails to clear within this time, the circuit breaker 12 closes and remains closed. Consequently current from all of the feeder circuits is available for blowing the fuses adjacent the fault F. If desired, the relay 40, after an operation thereof, may be maintained in contact opened position. Preferably, however, the relay 40 closes its back contacts after the expiration of a predetermined time delay. This time delay should be sufficient to assure the blowing of fuses 3 adjacent the fault F.

From the foregoing discussion, it is believed that the operation of the system illustrated in Fig. 1 is clear. Assuming that all feeder circuits are in operation and all circuit breakers are closed, the various load circuits 10 receive energy from all feeder circuits. If it is desired to trip one of the circuit breakers 12 manually for inspection purposes or otherwise, the control element 24 of the desired circuit breaker is actuated to trip the tripping latch 21. This permits the circuit breaker 12 to open its main contacts 13 without closing its back contacts 14. Consequently, no shunt or artificial short circuit is established on the distribution or primary network circuit 1.

Should a fault occur on one of the feeder circuits such as the feeder circuit 4, the directional relay 27 of the associated unit 9 operates to energize the solenoid 25 into tripping engagement with the tripping latch 21. This again permits the circuit breaker 12 to open its main contacts 13 without closing its back contacts 14. Consequently, the distribution or primary network circuit 1 continues in normal operation from the remaining feeder circuits 5 and 6. After the faulty feeder circuit is repaired and reenergized, voltage appears across the secondary winding of the transformer 8 and the circuit breaker 12 consequently recloses to reconnect the feeder circuit to the distribution circuit.

If a fault F develops on one of the primary network mains 2, the impedance of the secondary mains restricts the current from the feeder circuit 6 to the fault F to a value substantially smaller than that of the feeder circuits 4 and 5. Consequently, the overcurrent relays 33 for the circuit breakers associated with the feeder circuits 4 and 5 operate first to actuate the associated tripping latches 20 and 21. As a result of this operation, the circuit breakers 12 associated with the feeder circuits 4 and 5 open their main contacts 13 to disconnect the feeder circuits 4 and 5 from the distribution or primary network circuit 1. In addition, these circuit breakers close their back contacts 14 to establish shunt circuits or artificial short circuits across the conductors of the distribution or primary network circuit adjacent the fault F. These shunt or artificial short circuits tend to lower the voltage of the distribution or primary network circuit adjacent the fault F and facilitate the clearance of the fault.

Since the feeder circuits 4 and 5 remain energized, the closing relay 47 associated with each of these circuits closes its contacts and initiates a reclosing operation of the associated circuit breaker. The circuit breakers 12 associated with the feeder circuits 4 and 5 thereupon close their main contacts 13 and open their back contacts 14 to reconnect the feeder circuits to the distribution or primary network circuit 1. If the fault F has cleared prior to the reclosure of the circuit breakers the circuit breakers remain closed and all feeder circuits remain in service to provide normal operation of the system.

If the fault F fails to clear prior to this reclosing operation of the circuit breakers, the same circuit breakers again trip and reclose in an effort to clear the fault. If the fault fails to clear prior to the expiration of the time delay of the lockout relays 40, the lockout relays associated with the circuit breakers on each side of the fault F open their contacts to prevent further tripping of the associated breakers. Since all feeder circuits are now connected to the distribution or primary network circuit, extremely large currents are supplied to the fault F thereby facilitating blowing of the fuses 3 adjacent the fault F. After the two fuses on opposite sides of the fault F have blown, the reclosing time delay for the lockout relays 40 expires and the lockout relays return to the condition illustrated in Fig. 2. The system of Fig. 1 then continues in operation receiving energy from all feeder circuits 4, 5 and 6, but with the one faulty primary main 2 out of service.

In Fig. 3 a protector unit 9A is disclosed which may be employed in place of the unit 9 shown in Fig 2. The unit 9A includes a circuit breaker 12A which corresponds to the circuit breaker 12 of Fig. 2. It will be observed, however, that the circuit breaker 12A is controlled only by the tripping latch 21 which is operated by the tripping solenoid 36 or the control element 24 in exactly the same manner as in Fig. 2. The circuit breaker 12A of Fig. 3 has only two positions, one, a closed position wherein the main contacts 13 are closed, and the second, an open position where the main contacts 13 are open.

The shunt or artificial short circuit in Fig. 3 is provided with a pair of contacts 14A which correspond to the contacts 14 of Fig. 2. The contacts 14A are closed by an auxiliary switch 60 having a closing solenoid 61. The winding of the closing solenoid 61 may be placed in series with the winding of the tripping solenoid 36 for energization under the control of the overcurrent relay 33. When the overcurrent relay 33 picks up to close its front contacts, the circuit breaker 12A is tripped and the auxiliary switch 60 is actuated to close the contacts 14A. Closure of the contacts 14A establishes a shunt or artificial short circuit across the conductors L1 and L2. Although a momentary closure of the contacts 14A ordinarily suffice, if desired, the switch 60 may be provided with a short time delay in its opening direction. Such a time delay maintains the contacts 14A closed for a brief interval to facilitate clearance of any fault which occurs adjacent thereto. When the circuit breaker 12A trips, the energizing winding of the solenoid 61 is deenergized by the opening of the pallet switch 42 as well as by the opening of the contacts of the overcurrent relay 33. Reclosure of the circuit breaker 12A may be effected in the same manner as reclosure of the circuit breaker 12 in Fig. 2. It will be observed that manual operation of the tripping latch 21 through the control element 24 or energization of the tripping solenoid 25 by the associated directional relay (not shown in Fig. 3) has no effect on the switch 60. It is believed that the operation of the unit 9A shown in Fig. 3 is apparent from the discussion of Figs. 1 and 2.

A further modification of the unit 9 is represented by the unit 9B shown in Fig. 4. The unit 9B comprises a circuit breaker 12B which is pivoted for rotation about a fixed pivot 70. This circuit breaker 12B includes a pair of movable contacts 71 and 72 which are movable respectively into engagement with a contact 13B and a contact 14B. The contact 13B corresponds to the contacts 13 of Fig. 2 and engagement of the contacts 13B and 71 serves to connect the transformer 8 to the distribution or primary network circuit.

The contact 14B corresponds to the contacts 14 of Fig. 2. Engagement of the contacts 14B and 72 establishes a shunt or artificial short circuit across the conductors L1 and L2. The tripping latch 21 latches the circuit breaker 12B with the contacts 71 and 13B in engagement. The latch 21 is operated by a tripping solenoid 36 in a manner set forth with reference to Figs. 2 and 3.

Fig. 4 also illustrates the control element 24B which corresponds to the control element 24 of Figs. 2 and 3. This control element may be operated when it is desired to trip the circuit breaker 12B without bringing the contacts 72 and 14B into engagement. For this purpose an insulating member 73 is provided for insertion between the contacts 72 and 14B in response to actuation of the control element 24B. Such operation of the insulating member 73 may be effected by pivoting the insulating member to one end 74A of a bell crank 74 which is pivoted for movement about a fixed pivot 75. The remaining end 74B of the bell crank normally rests on a flange 24C carried by the control element 24B. Consequently, actuation of the control element 24B to trip the circuit breaker 12B operates to extend the insulating member 73 between the contacts 72 and 14B. Reclosure of the circuit breaker 12B may be effected by the closing solenoid 45 in the manner set forth with reference to Fig. 2.

Fig. 5 discloses a modification 9C of the unit 9 wherein the arc established during the operating operation of a circuit breaker 12C is employed for establishing a shunt or artificial short circuit across conductors L1 and L2. The circuit breaker 12C may be similar to the circuit breaker 12A of Fig. 3 and may be operated in the same manner. If the circuit breaker 12C is tripped while carrying current, an arc is established between contacts 13 which is drawn into an arc chute 80 associated with the circuit breaker 12C. The construction of such circuit breakers and arc chutes is well known in the art.

In order to establish a shunt or artificial short circuit across the conductors L1 and L2, an auxiliary contact 81 may be positioned in the path of the arc established between the contacts 13 during the opening operation of the circuit breaker 12C. This contact 81 serves as a portion of shunt or artificial short circuit having a section completed by the arc started between the contacts 13. This shunt or artificial short circuit may be traced from the conductor L2 through the impedance 17, a conductor 82, the contact 81, the portion of an arc occurring between the contact 81 and the right-hand contact 13 (as viewed in Fig. 5) to the conductor L1. Consequently, opening of the circuit breaker 12C serves to establish a shunt or artificial short circuit across the conductors L1 and L2. This shunt circuit is interrupted when the arc forming a part thereof is extinguished in the arc chute.

If it is desired to provide a tripping operation of the circuit breaker 12C without establishing a shunt or artificial short circuit for the conductors L1 and L2, an auxiliary switch 83 may be included in the shunt circuit. This switch may be opened prior to the desired tripping operation of the circuit breaker 12C.

In Fig. 6 a circuit breaker 12B is represented which may correspond to the circuit breaker 12A of Fig. 3 and which may be operated similarly. To establish a shunt or artificial short circuit across the conductors L1 and L2 of Fig. 6, a fuse may be employed. This fuse may be directed into a tube 90 lined with fiber, or boric acid, or some similar material capable of developing an arc extinguishing gas when subjected to an electrical arc. Electrodes 91 and 92 are provided at the ends of the tube which are connected respectively to the conductors L1 and L2.

A fuse element 93 in the form of a spiral may be carried by a rotatable shaft 94. Rotation of the shaft is effected by a suitable motive device such as a spring motor 95. Rotation of the shaft is controlled by a solenoid 96 which is biased normally by means of a spring 97 into the path of rotation of an arm 98 carried by the shaft 94. Retraction of the solenoid 96 from the path of rotation of the arm 98 is effected by energizing the winding of the solenoid from the secondary winding of a current transformer 99.

When a fault occurs on the distribution or primary network circuit associated with the circuit breaker 12D, the circuit breaker 12D is tripped in the same manner as the circuit breaker 12A of Fig. 3. In addition, the excessive current flowing to the fault operates the solenoid 96 out of the path of the arm 98. This permits the spring motor 95 to rotate the shaft 94 in the direction of the arrow. Such rotation of the shaft feeds the fuse element 93 into the tube 90. The fuse element establishes a connection between the electrodes 91 and 92 to provide a shunt or artificial short circuit across the conductors L1 and L2. The excessive flow of current through a portion of the fuse element within the tube 90 melts the material of the fuse and opens the shunt or artificial short circuit. It is believed that a further discussion of Fig. 6 is unnecessary in view of the extended discussion of the remaining figures of the drawings.

In Fig. 7 a circuit breaker 12E is disclosed which corresponds to the circuit breaker 12A of Fig. 3. When this circuit breaker 12E opens it places a vapor discharge tube 100 in condition to establish a shunt circuit across the conductors L1 and L2. If desired a suitable impedance such as a resistor 101 may be included in the shunt circuit for controlling the magnitude of the current passing therethrough.

The vapor discharge tube 100 conveniently may be of the immersed ignition electrode type. Two ignition electrodes 102 and 103 are partially immersed in mercury pools 104 and 105 respectively. The construction and operation of such a tube are well known in the art.

When the circuit breaker 12E opens it establishes firing circuits for the tube 100. Although various energizing sources for the firing circuits may be employed, batteries 106 and 107 are illustrated for this purpose. The firing circuits are completed through back contacts of pallet switches 108 and 109 carried by the circuit breaker 12E. Resistors 110 and 111 may be included in the firing circuits for controlling the flow of current therein.

In response to a fault and the resultant opening operation of the circuit breaker 12E, firing circuits for the tube 100 are established by closure of the pallet switches 108 and 109. The tube 100 thereupon is rendered conductive to establish a shunt circuit across the conductors L1 and L2. This shunt circuit assists in lowering the voltage of the system adjacent the fault. Reclosure of the circuit breaker which may occur after a brief time delay, interrupts the firing circuits for the tube 100, and in effect interrupts the shunt circuit across the conductors L1 and L2.

Normally closed switches 112 may be included in the firing circuits. If it is desired to trip the circuit breaker 12E without establishing a shunt circuit through the tube 100, the switches 112 may be opened to render the firing circuits ineffective. It is believed that the operation of the modification illustrated in Fig. 7 in a complete system is apparent from the foregoing discussion of the other figures shown in the drawings.

Although the invention has been described with reference to certain specific embodiments thereof, numerous modifications are possible. Therefore the invention is to be restricted only by the appended claims.

We claim as our invention:

1. In an electrical system, an electrical circuit, a plurality of sources of electrical energy connected to said electrical circuit, means responsive to a condition of said electrical circuit when a fault occurs thereon for disconnecting a part of said sources of electrical energy from the fault, said means operating with inverse time delay, means effective only after operation of said disconnecting means for short-circuiting the conductors of said electrical circuit to assist in lowering the voltage of said electrical circuit adjacent said fault, and means effective after operation of said short-circuiting means for restoring the connection of said part of said sources.

2. In an electrical system, an electrical circuit, a plurality of sources of electrical energy connected to said electrical circuit, means responsive to a condition of said electrical circuit when a fault occurs thereon for disconnecting a part of said sources of electrical energy from the fault, means effective after said disconnection for short-circuiting temporarily the conductors of said electrical circuit to assist in reducing the voltage of said electrical circuit adjacent said fault, means effective after operation of said short-circuiting means for restoring the connection of said part of said sources, and means responsive to persistence of said fault after operation of said restoring means for segregating the faulty portion of said system from the remainder of said system.

3. In an electrical system, an electrical circuit, a plurality of sources of electrical energy for energizing said electrical circuit, and separate means for connecting each of said sources of electrical energy to said electrical circuit, each of said separate means comprising a circuit breaker for connecting and disconnecting the associated source of energy relative to said electrical circuit, tripping means responsive to a condition of said electrical circuit when a fault occurs thereon for tripping the circuit breaker, means responsive to said condition for establishing a shunt on said electrical circuit adjacent said circuit breaker, said last-named means being effective for establishing the shunt only after a tripping operation of said tripping means, means for closing said circuit breaker, and auxiliary means for segregating the faulty portion of said electrical circuit from the remainder thereof, said auxiliary means being effective only after said shunt establishing means has failed to clear said fault.

4. In an electrical system, an electrical circuit, a plurality of sources of electrical energy for energizing said electrical circuit, and separate means for connecting each of said sources of electrical energy to said electrical circuit, each of said separate means comprising a circuit breaker for connecting and disconnecting the associated source of energy relative to said electrical circuit, tripping means responsive to a condition of said electrical circuit when a fault occurs thereon for tripping the circuit breaker, said tripping means operating with inverse time delay, means effective after said circuit breaker trips for establishing a shunt on said electrical circuit to assist in lowering the voltage of said electrical circuit adjacent the fault thereon, means for closing said circuit breaker, and auxiliary means responsive to current flowing to said fault for segregating the faulty portion of said electrical circuit from the remainder thereof, said auxiliary means having a time of operation substantially greater than the time normally required for an operation of said shunt establishing means, whereby said auxiliary means operates only for faults which are not cleared by said shunt establishing means.

5. In an electrical system, an electrical circuit, a plurality of sources of electrical energy for energizing said electrical circuit, and separate means for connecting each of said sources of electrical energy to said electrical circuit, each of said separate means comprising a circuit breaker for connecting and disconnecting the associated source of energy relative to said electrical circuit, tripping means responsive to a condition of said electrical circuit when a fault occurs thereon for tripping the circuit breaker, means responsive to said condition for establishing a shunt on said electrical circuit adjacent said circuit breaker, said last-named means being effective for establishing the shunt only after a tripping operation of said tripping means, means for closing said circuit breaker, auxiliary means for segregating the faulty portion of said electrical circuit from the remainder thereof, said auxiliary means being effective only after said shunt establishing means has failed to clear said fault, and means for restricting the number of tripping and closing operations of said circuit breaker.

6. In an electrical system, an electrical circuit, a plurality of sources of electrical energy for energizing said electrical circuit, and separate means for connecting each of said sources of electrical energy to said electrical circuit, each of said separate means comprising a circuit breaker for connecting and disconnecting the associated source of energy relative to said electrical circuit, tripping means responsive to a condition of said electrical circuit when a fault occurs thereon for tripping the circuit breaker, said tripping means operating with inverse time delay, means effective after said circuit breaker trips for establishing a shunt on said electrical circuit to assist in lowering the voltage of said electrical circuit adjacent the fault thereon, means for closing said circuit breaker, auxiliary means responsive to current flowing to said fault for segregating the faulty portion of said electrical circuit from the remainder thereof, said auxiliary means having a time of operation substantially greater than the time normally required for an operation of said shunt establishing means, whereby said auxiliary means operates only for faults which are not cleared by said shunt establishing means, and means for restricting the number of immediately consecutive tripping and closing operations of said circuit breaker, said last-named means being effective for leaving said circuit breaker in closed condition.

7. In an electrical system; an electrical circuit; a plurality of sources of electrical energy connected to said electrical circuit; means responsive to a condition of said electrical circuit when a fault occurs thereon for disconnecting a part of said sources of electrical energy from the fault; auxiliary means cooperating with said first-named means for disconnecting said part of said sources, said auxiliary means being operable independently of the occurrence of said fault; and means, effective for operations of said first-named means and ineffective for operations of said auxiliary means, for lowering the voltage of said electrical circuit adjacent the fault.

8. In an electrical system, an electrical circuit, a plurality of sources of electrical energy for energizing said electrical circuit, and separate means for connecting each of said sources of electrical energy to said electrical circuit, each of said separate means comprising a circuit breaker for connecting and disconnecting the associated source of energy relative to said electrical circuit, tripping means responsive to a condition of said electrical circuit when a fault occurs thereon for tripping the circuit breaker, auxiliary tripping means cooperating with said first-named tripping means for tripping said circuit breaker, said auxiliary tripping means being operable independently of the occurrence of said fault, and means effective only for tripping operations of said first-named tripping means for establishing a shunt on said electrical circuit adjacent said circuit breaker.

9. In an electrical system, an electrical circuit, a circuit breaker associated with said electrical circuit, said circuit breaker having a first pair of contacts closed in a first condition of said circuit breaker and open in a second condition thereof for controlling said electrical circuit, and having a second pair of contacts closed in said second condition and open in said first condition of said circuit breaker, means associated with said second pair of contacts for modifying said electrical circuit, means responsive to a condition of said electrical circuit for actuating said circuit breaker from said first to said second condition, and manually operable means cooperating with said first-named means for actuating said circuit breaker to an intermediate condition wherein both of said pairs of contacts are open.

10. In an electrical system, an electrical circuit, a circuit breaker having main contacts associated with said electrical circuit, said circuit breaker having back contacts which are closed when said circuit breaker is tripped to open said main contacts, means for positioning said circuit breaker in an intermediate position with said main contacts and said back contacts open, means responsive to a variable quantity in said electrical circuit for tripping said circuit breaker, said last-named means being effective for releasing said positioning means to permit closure of said back contacts, and means responsive to closure of said back contacts for establishing a short-circuit across said electrical circuit.

11. In an electrical distribution system; a plurality of sources of electrical energy; a distribution circuit; a separate transformer for coupling each of said sources of electrical energy to said distribution circuit; disconnecting means responsive to a variable condition of said distribution circuit and effective after a time delay for disconnecting said distribution circuit between the points of connection thereto of said transformers; and separate means for controlling the connection of each of said transformers to said distribution circuit; each of said controlling means comprising a circuit breaker connecting the associated transformer to the distribution circuit, a pair of contacts associated with said circuit breaker, means for tripping said circuit breaker to open the connection between the associated transformer and said distribution circuit, said tripping means being ineffective for establishing conduction between said contacts, means responsive to a variable quantity passing through the associated transformer for tripping said circuit breaker, said last-named means including means for establishing conduction between said contacts, means effective upon establishment of conduction between said contacts for short-circuiting said distribution circuit adjacent said circuit breaker, means for reclosing said circuit breaker, means responsive to a predetermined series of immediately successive tripping and reclosing operations of said circuit breaker for preventing further tripping of said circuit breaker for a time greater than said time delay.

12. In an alternating current electrical system, an electrical distribution circuit, a plurality of sources of alternating electrical energy, and separate means for coupling each of said sources of electrical energy to said distribution circuit, each of said means comprising a circuit breaker having contacts for connecting and disconnecting the associated source of electrical energy relative to said distribution circuit, said circuit breaker having an arc formed when said contacts are separated while carrying current, and an auxiliary circuit including a normally open section in the path of said arc for shunting said distribution circuit, said arc serving to complete a conductive path for said auxiliary circuit, said auxiliary circuit short-circuiting said distribution circuit to lower substantially the voltage thereof.

13. In an electrical system, an electrical distribution circuit, a plurality of sources of electrical energy, and separate means for coupling each of said sources of electrical energy to said distribution circuit, each of said means comprising a circuit breaker having contacts for connecting and disconnecting the associated source of electrical energy relative to said distribution circuit, and means adjacent said circuit breaker for establishing a shunt circuit across said distribution circuit, said last-named means including a fusible element operating to open said shunt circuit in response to the passage of current therethrough.

14. The method of clearing a fault on an electrical circuit supplied from a plurality of sources of electrical energy, which comprises disconnecting from said electrical circuit a first source or sources of electrical energy adjacent said fault, temporarily lowering the voltage on said electrical circuit adjacent said fault for the purpose of assisting the clearance of said fault while said electrical circuit receives energy from a source or sources of electrical energy distant from said fault, and reconnecting said disconnected source or sources of electrical energy to said electrical circuit.

15. The method of clearing a fault on an electrical circuit supplied from a plurality of sources of electrical energy and having time-delayed sectionalizing means between said sources of electrical energy, which comprises disconnecting from said electrical circuit a first source or sources of electrical energy adjacent said fault, temporarily lowering the voltage on said electrical circuit adjacent said fault for the purpose of assisting the clearance of said fault while said electrical circuit receives energy from a source or sources of electrical energy distant from said fault, reconnecting said disconnected source or sources of electrical energy to said electrical circuit, repeating said disconnecting, lowering, opening and reconnecting steps, and maintaining said first source or sources closed for a time sufficient to permit opening of said sectionalizing means if said fault fails to clear.

16. In an electrical system, a plurality of spaced sources of electrical energy, an electrical circuit having conductors electrically connecting said sources of electrical energy, said conductors operating to conduct electrical energy from said sources of electrical energy normally to points suitable for supplying electrical loads, means responsive to a condition of said electrical circuit when a fault occurs thereon adjacent a first part of said sources of electrical energy for disconnecting said first part of said sources from the fault, whereby said fault continues to receive electrical energy from a second part of said sources of electrical energy, and means effective only after said disconnection of the first part of said sources for establishing a short-circuit between said conductors adjacent said fault, whereby the impedance of the portion of said electrical circuit between said fault and the second part of said sources of electrical energy restricts the flow of electrical energy to the short-circuit and lowers the voltage across said conductors adjacent the fault.

LEON R. LUDWIG.
ROYAL C. BERGVALL.